Oct. 4, 1960

E. V. PARZIALE 2,955,242

HERMETICALLY SEALED POWER TRANSISTORS

Filed Nov. 27, 1956

INVENTOR
ERNEST V. PARZIALE
BY Elmer J. Gorn
ATTORNEY 2,955,242

HERMETICALLY SEALED POWER TRANSISTORS

Ernest V. Parziale, Arlington, Mass., assignor to Raytheon Company, a corporation of Delaware Filed Nov. 27, 1956, Ser. No. 624,670

4 Claims. (Cl. 317—234)

Figure 1:
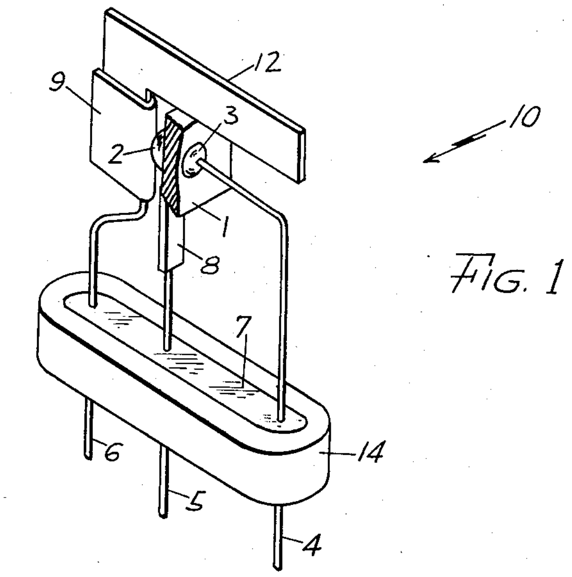

This invention relates generally to electrical translation devices of the type wherein utilization is made of a body of semiconductive material provided with a plurality of electrical connections to the body, and more particularly to devices of this class now commonly called transistors.

Semiconductive devices are now known in which a body of semiconductive material, for example, germanium or silicon, is provided with zones or regions of different electrical conductivity type material, the conductivity type being dependent upon the inclusion in the body of what are termed "significant" impurity materials which alter the electrical characteristics of the body. The impurity materials are of two different types, those designated as "donor" impurities, and those designated as "acceptor" impurities. The former type supplies unbonded electrons to the crystal structure of the semiconductive body which serve as negative mobile charge carriers, and the latter supplies electron deficiencies or "holes" which serve as positive mobile charge carriers. A semiconducting material in which conduction by "holes" normally occurs, is identified as P-type, whereas the type in which the principle conduction occurs by electrons is identified as N-type.

In one form, such a device may comprise a body of semiconductive material having two spaced zones of the same conductivity type material with a zone of different type conductivity material imtermediate the two spaced zones. For instance, the two spaced zones may be P-type material and the intermediate zone may be N-type material, or, vice versa, the two spaced zones may be N-type material and the intermediate zone may be P-type material. One of the spaced zones is termed the emitter region or electrode, the other spaced region is termed the collector region or electrode, and the intermediate region is designated as the base region. Each of these regions is provided with an external electrical connection designated, respectively, as the emitter, collector and base connections. These devices find application in various electrical circuits, being used as amplifiers, oscillators and as power units.

In the past, the utilization of these devices as power units has been limited by the generation of heat incident to the power transferring function, which generated heat restricted the efficient performance of the devices. The heat thus generated often resulted in undesired alteration of the electrical characteristics of the semiconductive body, and in extreme cases, self destruction of the device itself. These prior art devices usually provide a plastic housing around the transistor with means extending externally through the housing for dissipating the generated heat energy. However, these devices are subject to a number of disadvantages which inhibit efficient operation, among which is the lack of a true hermetic seal at the point where the heat dissipating means extrudes from the plastic housing. At best, a good plastic-to-metal seal is difficult to realize, and even if attained, is subject to deterioration with extended use and physical abuse, thereby allowing moisture and other contaminating material to enter the plastic housing and deleterious affect the operating characteristics of the device. Accordingly, the present invention is directed toward a novel semiconductive device structure in which a true hermetic seal can be attained and still provide means for effectively dissipating internally generated heat energy. In accordance with the present invention, the heat dissipating means are contained entirely within the device package, thus allowing a hermetic seal to be realized, and yet provide an efficient disposition of the generated heat energy to an external sink. This is accomplished by providing a relatively wide area heat transferring strip, one end of which is connected directly to the electrode of the device at which greatest heating occurs, and the other end of which is connected to the interior surface of the metal housing. A hermetic seal between a metal can surrounding the unit and a metal-clad glass stem, which supports the external electrical leads, insures against the deterioration to which prior art devices were subject.

Figure 2:
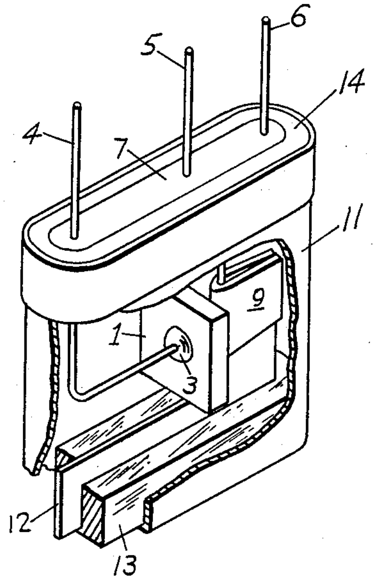

The invention will be better understood as the following description proceeds taken in conjunction with the accompanying drawing wherein:

Fig. 1 is a greatly enlarged perspective view showing a structure in accordance with the present invention before encapsulation in the metal can; and Fig. 2 is a greatly enlarged inverted perpsective view showing the structure of Fig. 1 after insertion into the metal can.

Referring now to the drawing, and more particularly to Fig. 1 thereof, there is shown generally at 10 a transistor mounting structure comprising a body of semiconductive material 1 having dots of impurity material 2 and 3 fused to opposite sides thereof. In accordance with principles well known in the art, the dots 2 and 3 may be of a material which imparts the desired type of electrical conductivity characteristic to adjacent regions of the chip 1. For example, the chip 1 may be N-type germanium prepared by any suitable well known method, and the dots 2 and 3 may be a P-type impurity material, such as indium. The dots 2 and 3, respectively, form the emitter and collector electrodes of the device. A plurality of lead-in wires 4, 5 and 6 are insulatedly supported in a stem-base 7, which may be glass, for example, in order to provide support for the chip 1, as well as for the external electrical connections. The lead-in wire 4 is attached to the collector electrode 3, the lead-in 5 is attached to a base tab 8 which, in turn, is attached to chip 1, while the lead-in wire 6 is connected to a relatively wide surface area tab 9 having its wide portion attached to the emitter electrode 2. Tab 9 is preferably made of a good heat conducting material, for example, copper. The glass stem-base 7 has a metal jacket 14 sealed to the outer periphery thereof in order to provide means for subsequently effecting a metal-to-metal seal between the mounting and the enclosing metallic housing 11. To effect efficient dissipation of heat generated at the emitter electrode 2, an angled strip of heat conducting material 12, such as copper, is attached to tab 9 as by soldering, and extends across the top portion of the mounting structure.

After the unit of Fig. 1 has been thus assembled, it may be inserted and sealed into the metal can 11, as shown in Fig. 2. This is preferably accomplished by melting a charge of a suitable solder in the bottom portion of the can 11, as viewed in Fig. 2, and then inserting the mounting structure 10 into the can 11 so that the copper strip comes into contact with the interior surface of the can 11, the strip 12 being securely attached to the interior surface of the can by the solidified layer of solder 13. If desired, the hermetic seal may be simultaneouly made between the metal jacket 14 and the lower portion of the can 11 by means of suitable soldering techniques in order to provide the completed enclosing envelope. It should be understood that the above-described sealing procedure takes place in a dry air or inert gaseous atmosphere in order to avoid contaminating the surface of the semiconductive chip 1. Both the copper strip 12 and the surface of the metal case which it contacts may be pretinned and precleaned with the same solder, thereby allowing a solder joint between the strip 12 and the case 11 to be attained without the use of a flux which would undesirably contaminate the surface of the semiconductive body 1.

It can thus be seen that a semiconductive device structure has been provided which is hermetically sealed at all points exposed to the atmosphere, and yet allows internally generated heat energy to be effectively dissipated. In the device described, the heat energy generated at the emitter junction when the device is in operation, is transferred from the emitter electrode 2 through the copper tab and strip 9 and 12 and solder layer 13 to the can 11. The metal can 11 may preferably be mechanically attached to the chassis of the equipment in which the device is being used in order to give even greater heat dissipation. Although the heat transfer strip 12 has been shown as being attached to the emitter electrode 2 since this is where the greatest heat generation normally occurs, it should be understood that it may be connected to any electrode where it is desired to dissipate heat generated in the area of that electrode. With devices made in accordance with the present invention, the heat dissipation, measured as temperature rise of the emitter junction per unit increase of power input, has been found to be on the average of 51.5 centrigrade degrees per watt as compared to 35 centigrade degrees per watt for heretofore known units of this type.

Although there has been described what is considered to be a preferred embodiment of the present invention, various adaptations and modifications thereof may be made without departing from the spirit and scope of the invention as defined in the appended claims.

What is claimed is:

1. An electrical translation device comprising a body of semiconductive material having a plurality of rectifying electrodes in contact therewith, a hermetically sealed envelope encompassing said body and said electrodes, said envelope comprising a metal member having a plurality of conducting leads insulatedly supported therein and a metal can hermetically sealed to said metal member, at least a portion of said metal member forming part of the total interior surface of said envelope, at least one of said leads being connected to one of said rectifying electrodes, and metallic heat-conducting means connected to and projecting inwardly from a metallic interior portion of said envelope and providing a thermal conductance path therethrough between said body and said envelope which is substantially greater than that provided through any one of the said leads, said means being also connected to another of said rectifying electrodes whereby said means is entirely contained within said envelope.

2. An electrical translation device comprising a hermetically sealed metallic envelope composed of a metal member hermetically sealed to a metal can, said metal member having a plurality of conducting leads insulatedly supported therein, at least a portion of said metal member forming part of the total interior surface of said envelope, a body of semiconductive material connected to said leads, and a member of metallic heat-conducting material providing a susbtantially greater heat-transfer path than any one of said leads connected to a rectifying electrode region of said body and to an interior portion of said metallic envelope.

3. An electrical translation device comprising a hermetically sealed metallic envelope composed of a metal member hermetically sealed to a metal can, said metal member having a plurality of conducting leads insulatedly supported therein, at least a portion of said metal member forming part of the total interior surface of said envelope, a body of semiconductive material connected to said leads, and an inwardly projecting metallic body of relatively wide surface area heat-conducting material as compared to any one of said leads connected between an alloyed rectifying electrode of said body and an interior portion of said metallic envelope, said leads and said metallic body supporting said semiconductive body in spaced relation to the interior surface of said envelope.

4. An electrical translation device comprising a hermetically sealed metallic envelope composed of a metal member hermetically sealed to a metal can, said metal member having a plurality of conducting leads insulatedly supported thereby, at least a portion of said metal member forming part of the total interior surface of said envelope, a body of semiconductive material having different electrical conductivity-type regions which are connected to different ones of said leads, and a metallic heat-conducting connection providing a substantially greater thermal conductance path than any one of said leads connected between one of said regions and an interior portion of said envelope.

References Cited in the file of this patent

UNITED STATES PATENTS

| | | |
|---|---|---|
| 2,445,805 | Skinker | July 27, 1948 |
| 2,735,050 | Armstrong | Feb. 14, 1956 |
| 2,752,541 | Losco | June 26, 1956 |
| 2,763,822 | Frola et al. | Sept. 18, 1956 |
| 2,809,332 | Sherwood | Oct. 8, 1957 |
| 2,817,048 | Thuermel et al. | Dec. 17, 1957 |
| 2,825,014 | Willemse | Feb. 25, 1958 |